United States Patent
Cowherd

(10) Patent No.: US 8,175,638 B2
(45) Date of Patent: May 8, 2012

(54) VIRTUAL VIDEO MESSAGE ANSWERING MACHINE PLATFORM

(75) Inventor: Chris Cowherd, Redmond, WA (US)

(73) Assignee: Demand Media, Inc., Santa Monica, CA (US)

( * ) Notice: Subject to any disclaimer, the term of this patent is extended or adjusted under 35 U.S.C. 154(b) by 1383 days.

(21) Appl. No.: 11/743,649

(22) Filed: May 2, 2007

(65) Prior Publication Data

US 2008/0273077 A1    Nov. 6, 2008

(51) Int. Cl.
*H04M 1/00* (2006.01)
(52) U.S. Cl. ..................... 455/556.1; 370/352
(58) Field of Classification Search ............... 455/556.1, 455/414.1; 370/358
See application file for complete search history.

(56) References Cited

U.S. PATENT DOCUMENTS

| 7,636,348 B2* | 12/2009 | Bettis et al. ................. 370/352 |
| 2007/0067268 A1* | 3/2007 | Dai et al. .......................... 707/3 |
| 2007/0207782 A1* | 9/2007 | Tran ........................... 455/414.1 |

* cited by examiner

*Primary Examiner* — Curtis Kuntz
*Assistant Examiner* — Maria El-Zoobi
(74) *Attorney, Agent, or Firm* — Greenberg Traurig, LLP

(57) ABSTRACT

Enabling a user of a video chat application to a virtual video message answering machine to contextually provide a video message to at least one other user of the video chat application for play back if the user is unavailable. The video message can be arranged to be played when another user attempts to initiate a video communication session with the unavailable user or during an existing video chat session after the user becomes unavailable. Also, the user can choose one or more contexts for playing back a video message to one or more other users that are likely to be participants in a future video communication session. The other user is provided with a user interface that enables the other user to record a video message reply for subsequent playback by the unavailable user.

26 Claims, 7 Drawing Sheets

VIRTUAL VIDEO MESSAGE ANSWERING MACHINE PLATFORM

FIELD OF THE INVENTION

The present invention is directed to messaging, and more particularly, enabling a video message to be provided as the response to a received message.

BACKGROUND OF THE INVENTION

For most of the 20th century, the telephone call has been the preferred manner of synchronous (real time) communication between individuals that are remotely located from each other. Also, since almost no one is always available to answer a telephone call, once voice recording technology were sufficiently mature and affordable, the telephone answering machine became a mainstay of modern life. The basic telephone answering machine features typically include: answering a call for an unavailable telephone user, providing a voice greeting to the caller, and recording a message from the caller for later playback by the unavailable user.

More than a hundred years since the invention of the telephone, the telephone call remains the most widely used technology to communicate synchronously over long distances. However, video and text messaging technologies have recently become popular as an alternative to telephonic communication. In particular, video based communication, such as video chat, video messaging, and video conferencing has found wide acceptance among users of the Internet. However, even though video is often the preferred way to remotely communicate over a network between remotely located parties, some of the same issues that led to the development of the telephone answering machine are also impacting the general acceptance of video communication today. For example, until now, if another party was unavailable for video communication at a particular time, it was often impractical to either leave a message for the currently unavailable other party or provide a contextual greeting.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE EMBODIMENTS

Figure 1:
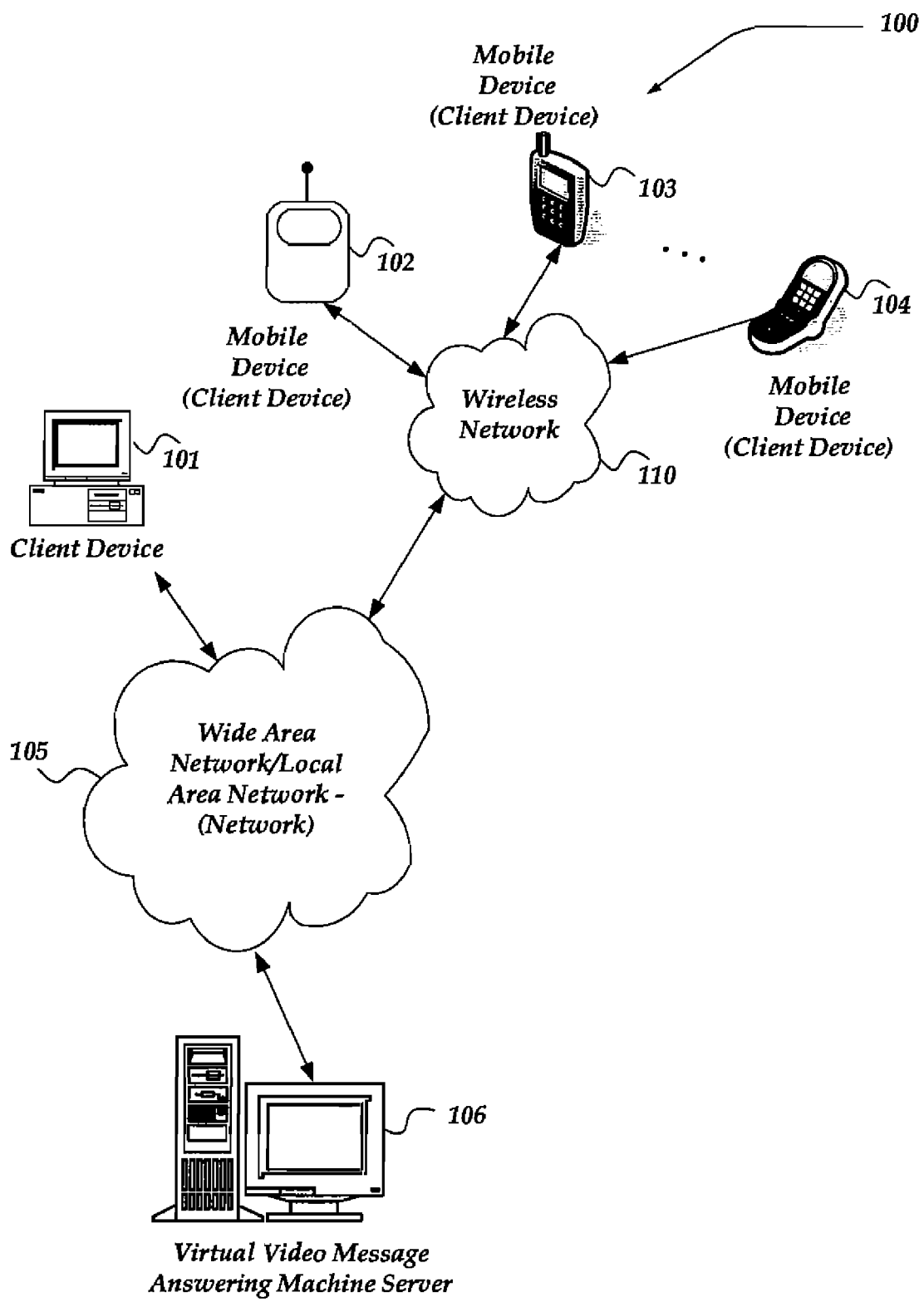
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed to enabling a user of a video communication application to use the inventive virtual video message answering machine to contextually provide a video message to at least one other user for play back if the user is unavailable. The video message can be arranged to be played when another user attempts to initiate a video communication session with the unavailable user or during an existing video communication session after the user becomes unavailable. Furthermore, one or more contexts can be determined for enabling the playing back of a video message to one or more other users that participate in a video communication session. For example, these contexts can include: generic (default), work, personal, events, holidays, seasons, weather, family, individual relationship, and/or the like. Also, at least one context can be associated with the other users that are known to the user based on one or more processes, including the user's contact lists, buddy lists, friends list, social networks, historical log, profile, cookies, video chat list, IP addresses, domains, networks, sub-networks, and/or the like.

In at least one or more embodiments, the video communication application employs at least a video player for enabling communication between each user in a video session. Furthermore, in at least one embodiment, the other user is provided with a user interface that enables the other user to record a video message or select a prerecorded message as a reply for subsequent playback by the unavailable user.

In at least one or more embodiments, the user can select a type of format that the video message can be played back by the other user, including but not limited to, Flash, Mpeg, Quick Time, Window Media, AVI, Real Video, and the like. Also, if the video player of the other user doesn't initially support the selected format for the video message, the virtual video message answering machine can facilitate either the installation of a new codec for enabling the other user's video player to play back the video message, or providing the video message in another format that is supported by that video player.

In at least one or more embodiments, the user can choose one or more conditions to indicate their unavailability. And once at least one of these conditions are met, a video message is provided for playback that has a context that is equivalent to the context determined to be associated with the at least one user participating in a video communication session with the unavailable user. In still at least one or more embodiments, the conditions selected by the user can include: (1) a minimum level for detection of movement in a scene recorded by a video camera; (2) one or more hot keys; (3) a time period for inactivity for a pointing device; (4) a time period for keyboard device inactivity; or (5) a predefined schedule that indicates unavailability of the user.

In at least another embodiment, the user can edit text, graphics, pictures, or the like that are overlaid on a video message that is displayed during playback to another user. Graphics may include speech balloons, light bulbs, symbols (#, @, %, or the like), smoke, icons, cartoons, illustrations, or the like. In yet at least another embodiment, the text can be recorded as the primary content in a video message. In still at least another embodiment, sound can be recorded and/or added to the video message, including but not limited to, music, voice, ambient noises, sound effects, prerecorded sounds provided by the user, prerecorded sounds provided by a third party, and the like. In another embodiment, a background and/or a foreground provided by a user or a third party may be added to the video message. Further, in yet another embodiment, the alpha channel for different elements compositied for display in the video message could be manipulated to create different levels of transparency. For example, by manipulating the alpha channel, different levels of transparency could be provided for at least one of a foreground, background, text, video, picture, or graphic.

Additionally, in at least one or more embodiments, a user is provided with tools to record, composit, and edit an original video message or edit and composit a prerecorded video message. The prerecorded video message may have been previously recorded by the user or provided by a third party, such as an online service. Also, the user can optionally choose one or more digital rights management (DRM) tools to protect unauthorized copying or editing of the recorded video messages, text, pictures, and/or graphics. These DRM tools can include Windows Media® DRM, iTunes® Fairplay®, and/or the like.

Also, in at least one or more embodiments, a ranking interface is provided to at least the other user that views the video message from the unavailable other user. The ranking can include creativity, appropriateness, quality of production, relevance, clarity, and/or the like. The ranking can be provided to the user directly by email, text message, alerts, or the like. Additionally, the ranking can be posted on a website, blog, chat room, or the like, and a process can also notify other users of the ranking of the user's video messages.

In at least one or more embodiments, an online platform for enabling the virtual video message answering machine can be arranged to operate as a system in one or more local or remote environments, including peer to peer, client-server, stand alone application, web based service, and/or the like. Also, the online platform can be accessed by users, customers, and third parties, with one or more different types of computing devices, including, but not limited to, personal computers, video game consoles, mobile telephones, smart watches, pagers, and/or personal digital assistants (PDA).

Additionally, in at least one environment, a video communication session can be provided in a window for a browser application, a Flash based multi-media player, a video players, a video chat application, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Virtual Video Messaging Answering Machine Sever 106, mobile (wireless) devices 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Person al Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome display on which only text may be displayed. In another example, a web-enabled mobile device may have a touch sensitive screen, a stylus, and several lines of a color display in which both text and graphics may be displayed.

Mobile devices 102-104 may further be configured to include a client application that enables an end-user to log into a membership account on website 112 that includes servers 106, 107, and 108. Such an end-user membership account, for example, may be configured to enable one or more activities, including. enabling the member to send/receive messages with other members, non-members, and the platform administrator(s); access content on selected web pages; access chat rooms; access blogs; access reviews of products and services by industry experts and/or other members; purchase products and/or services; and try out available demonstrations for products/services prior to purchase. However, participation in at least some of these activities may also be performed without logging into the end-user membership account. Additionally, mobile devices 102-104 may also communicate with non-mobile (wired) client devices, such as client device 101, or the like.

Figure 3:
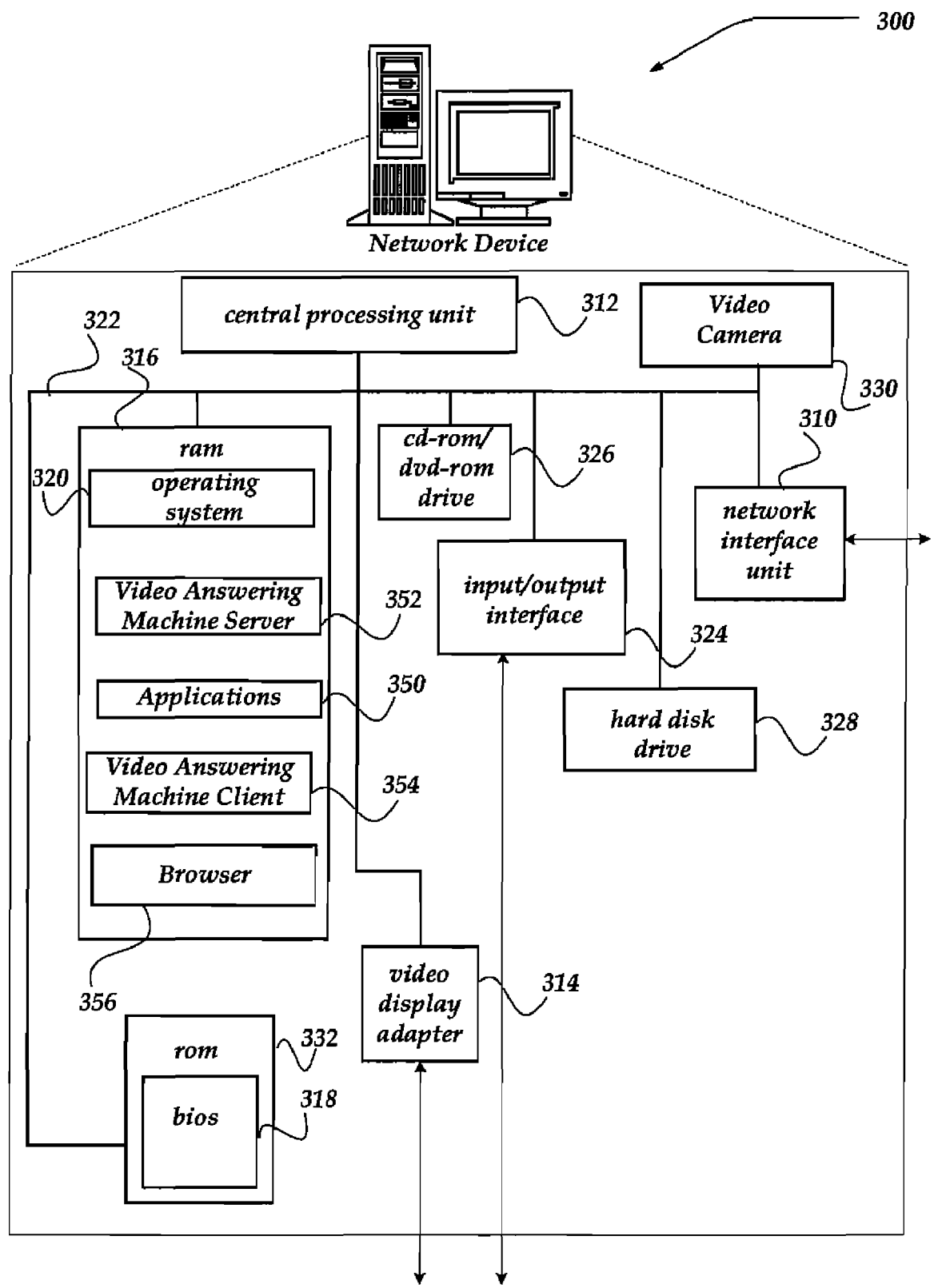
FIG. 3 illustrates a schematic diagram of one embodiment of an exemplary network device.

Client device 101 may include virtually any computing device capable of communicating over a network to send and receive information, such as network device 300 shown in FIG. 3, or the like. The set of such client devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with communication provided over network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further employ a plurality of access technologies including 2nd (2G), 3rd (3G), and $4^{th}$ (4G) generation radio access for cellular systems, WLAN, WiMax, Wireless Router (WR) mesh, and the like. Access technologies such as 2G, 3G, 3G, and future wireless access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), Universal Mobile Telephone System (UMTS), and the like. In essence, wireless network 110 may include virtually any wireless communication mechanism by which information may travel between mobile devices 102-104 and another computing device, network, and the like.

Network 105 is configured to couple platform 112 and its servers with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modern and temporary telephone link. In essence, network 105 includes any communication method by which information may travel between platform 112, client device 101, and other computing devices.

Additionally, communication media typically embodies processor-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Platform 112 can also include a variety of services used to provide services to remotely located members. Such services include, but are not limited to web services, third-party services, audio services, video services, email services, NM services, SMS services, MMS services, VOIP services, video game services, blogs, chat rooms, gaming services, calendaring services, shopping services, photo services, or the like. Although FIG. 1 illustrates server 106 as a physically separate computing device, the invention is not so limited. For example, one or all of multiple servers can be operated on one computing device, without departing from the scope or spirit of the present invention. Also, devices that may operate as server 106 include personal computers desktop computers, multiprocessor systems, microprocessor-based or programmable consumer electronics, network PCs, servers, and the like.

Illustrative Mobile Device

Figure 2:
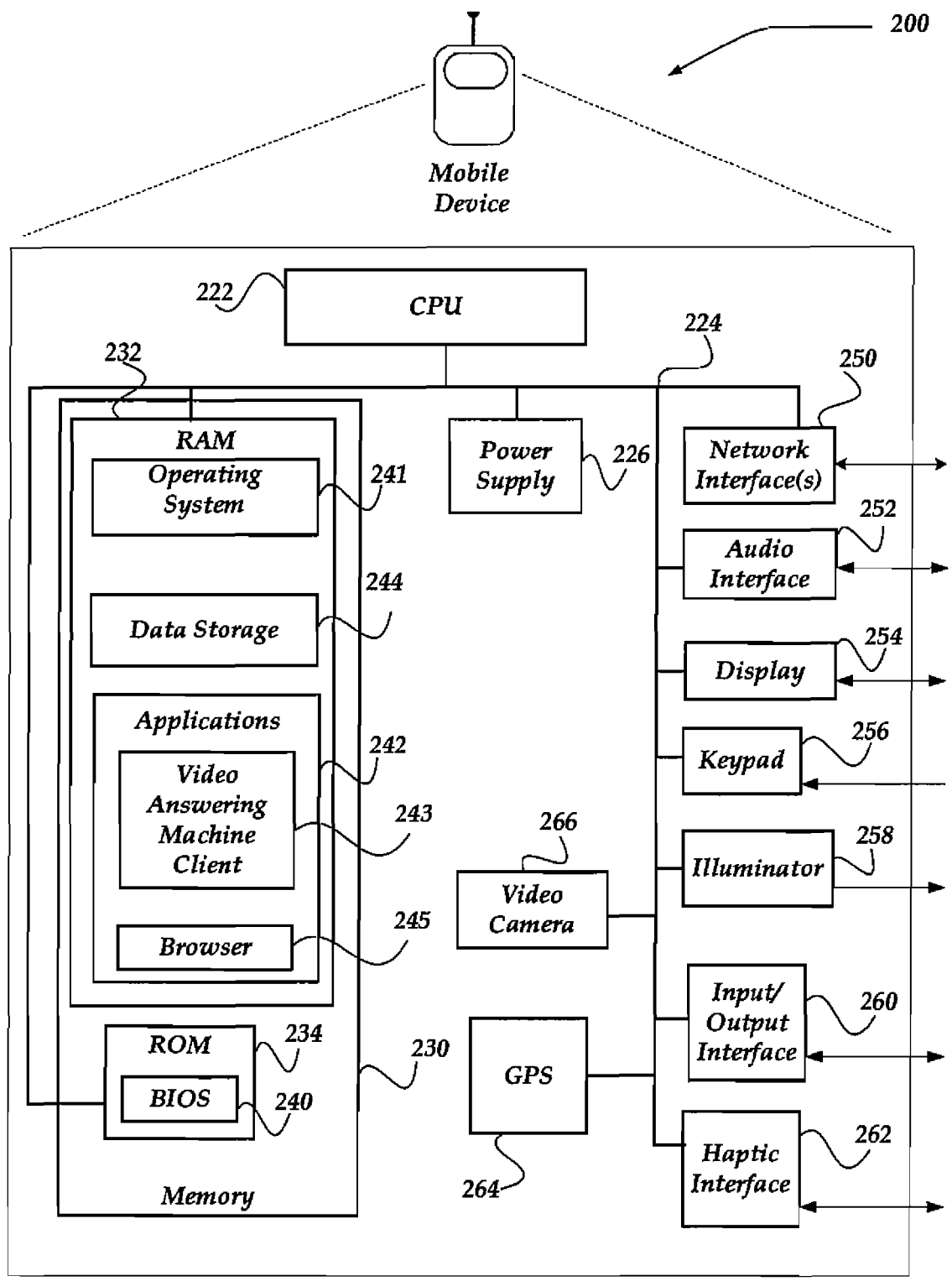
FIG. 2 shows a schematic diagram of one embodiment of an exemplary mobile device.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, a global positioning systems (GPS) receiver 264, and a video camera 266. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), Wide CDMA (CDMA), time division multiple access (TDMA), Universal Mobile Telephone Service (UMTS), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Additionally, video camera 266 is arranged to record still or moving images of scenes disposed in relatively close proximity to mobile device 200. Video camera can also be arranged as a sensor for determining the presence or lack thereof of motion is relatively close proximity to mobile device 200. Although not shown, video camera 266 can also include a light for illuminating scenes under dark ambient conditions. Also, video camera 266 can include controls for adjusting the focal length, zoom, and light sensitivity employed by the video camera to record scenes.

Mass memory 230 includes a RAM 232, a ROM 234, and other storage means. Mass memory 230 illustrates another example of computer storage media for storage of information such as processor readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, multi-media players, video players, audio players, email clients, IM applications, SMS applications, VOEP applications, contact managers, task managers, transcoders, database programs, word processing programs, security applications, spreadsheet programs, video games, gaming programs, search programs, shopping cart programs, and so forth. Applications 242 may further include video answering machine client 243, and browser 245. The browser application may be configured to receive and display graphics, text, multimedia, and the like, employing virtually any web based language, including a wireless application protocol messages (WAP), and the like. In one embodiment, the browser application for the mobile device is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display content and communicate messages.

Video Answering Machine client 243 may be configured to receive a request for a video chat session and enable a display of a contextual video message for the other user as a response to the request. Further, browser 245 in concert with client 243 can enable the user of mobile device 200 to select different video messages to be displayed in different contexts. In at least one embodiment, client 243 enables the user to select one or more previously recorded video messages and/or text for different contexts with different users.

Illustrative Network Device

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, guest pass server 106, membership server 107, video game server 108, and/or client device 101 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

Additionally, video camera 330 is arranged to record still or moving images of scenes disposed in relatively close proximity to network device 300. Video camera can also be arranged as a sensor for determining the presence or lack thereof of motion is relatively close proximity to network device 300. Although not shown, video camera 330 can also include a light for illuminating scenes under dark ambient conditions. Also, video camera 330 can include controls for adjusting the focal length, zoom, light sensitivity, and the like, employed by the video camera to record scenes.

The mass memory as described above illustrates another type of processor-readable storage media. Processor readable storage media may include volatile, nonvolatile, removable, and non-removable media implemented in any method or technology for storage of information, such as processor readable instructions, data structures, program modules, code, or other data. Examples of processor readable storage media include RAM, ROM, EEPROM, flash memory or other memory technology, CD-ROM, digital versatile disks (DVD) or other optical media, magnetic cassettes, magnetic tape, magnetic disk storage or other magnetic storage devices, or any other medium which can be used to store the desired information and which can be accessed and read by a processor for a computing device.

The mass memory also stores program code and data. One or more applications 350 are loaded into mass memory and run on operating system 320. Examples of application programs may include transcoders, multi-media players, video players, audio players, schedulers, calendars, database programs, word processing programs, HTTP programs, customizable user interface programs, IPSec applications, encryption programs, security programs, VPN programs, SMS message servers, IM message servers, email servers, account management and so forth. Video Answering Machine server 354, Browser 356, and Video Answering Client 352 may also be included as an application program within applications 350. Also, Video Answering server 354, browser 356, and video answering client 352 can be configured as a platform for providing a virtual video message answering machine service that provides contextual video messages from an unavailable user in a video chat session with one or more other users.

Illustrative User Interface

Figure 4A:
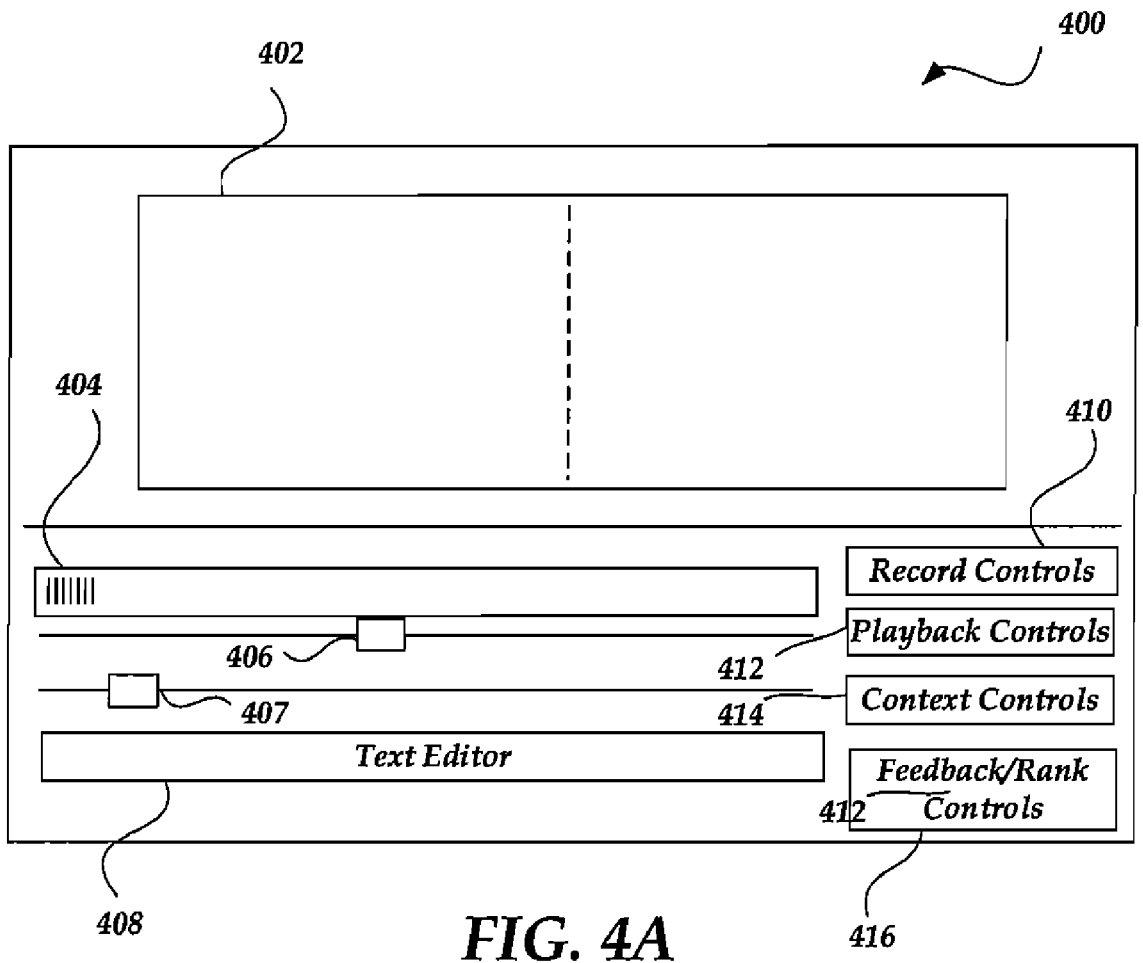
FIG. 4A shows an exemplary user interface for generating a video message for a virtual video message answering machine platform.

FIG. 4A illustrates exemplary user interface 400 for creating and editing video messages for playback with the virtual video answering machine platform. As shown, display 402 is arranged for displaying a video message in the process of being recorded or play back of a previously recorded video message. Also, display 402 can be arranged to provide a split screen effect for editing, recording, and playback operations. Video message record controls 410 is provided, which can include but is not limited to, enabling a user to selectively cue, pause, record, dub, edit video effects, edit sound, edit text, edit graphics, fast forward, forward, reverse, fast reverse, and/or the like. A background and/or a foreground provided by a user or a third party may be added to the video message. Further, the alpha channel for different elements composited for display in the video message can be manipulated to create different levels of transparency. For example, by manipulating the alpha channel, different levels of transparency could be provided for at least one of a foreground, background, text, video, picture, or graphic. Video message Playback controls 412 is provided, which can include, but is not limited to, enabling a user to selectively play, pause, fast forward, reverse, fast reverse, split screen, and/or the like.

Additionally, context controls 414 is provided, which can include, but is not limited to, enabling a user to choose a context for each video message, such as generic (default), work, personal, events, holidays, seasons, weather, family, individual relationship, and/or the like. Context controls 414 can also provide for enabling the user to identify other users and their context in regard to the user based on one or more processes, including the user's contact lists, buddy lists, friends list, social networks, historical log, profile, cookies, video chat list, and/or the like. Also, Feedback and Rank Controls 416 is provided for viewing and editing feedback and ranking information regarding video messages played back for other users.

Video message Text editor 408 is provided for editing text, graphics, pictures, or the like that can be overlaid on other visual content in a video message and/or be recorded as the primary content in a video message. Slider control 406 is arranged for a user to set the minimum level/amount of motion to be detected in close proximity to a video camera (not shown) or else a contextual video message will be played for the other user in a video chat session. Motion indicator 404 provides a real time visual indication of the amount of motion detected by the video camera (not shown). User interface 400 may also include sensitivity slider 407. Sensitivity slider 407 is arranged for a user to set the minimum level/amount of movement sensitivity for determining lack of motion to be detected in close proximity to a video camera (not shown). Also, in at least one embodiment, user interface 400 is provided in a window for a browser, multi-media player, video player, and/or the like.

Figure 4B:
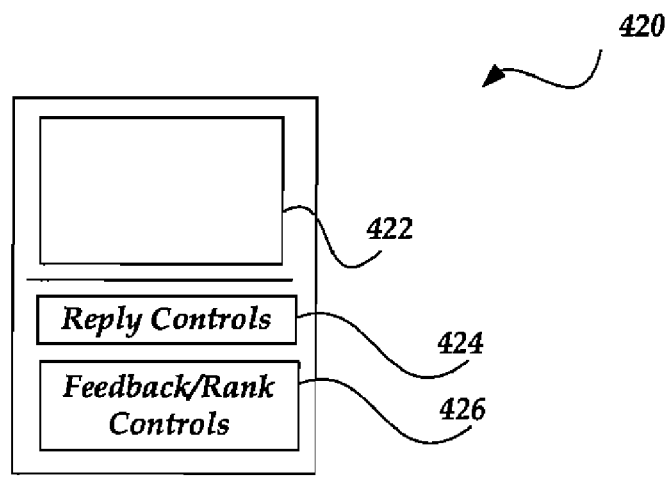
FIG. 4B illustrates an exemplary user interface for a playback window for a virtual video message answering machine platform.

FIG. 4B illustrates an exemplary user interface 420 for enabling the virtual video message answering machine platform to play back a video message from an unavailable user in a video chat session. In at least one embodiment, user interface 420 is provided in a window for a browser, multi-media player, video player, and/or the like. As shown, display 422 is arranged for displaying play back of a video message from an unavailable user. Also, display 402 can be arranged to provide a split screen effect for editing and playback operations. Video message reply controls 424 are provided for enabling the other user to record a video message reply to the video message provided on behalf of the unavailable user.

Reply control 424 includes controls for recording and playing back a new reply video message or editing a prerecorded reply video message, e.g., cue, pause, record, dub, composit, edit video effects, edit sound, edit text, edit graphics, fast forward, forward, reverse, fast reverse, play, pause, split screen, and/or the like. Backgrounds or foregrounds provided by a user or a third party may be added to the video message. Further, the alpha channel for different elements composited for display in the video message can be manipulated to create different levels of transparency. For example, by manipulating the alpha channel, different levels of transparency could be provided for at least one of a foreground, background, text, video, picture, or graphic. Also reply control 424 can include controls for adding context information to the reply video message, such as generic (default), work, personal, events, holidays, seasons, weather, family, individual relationships, and/or the like, based on one or more processes to identify the context of the unavailable user, including the other user's contact lists, buddy lists, friends list, social networks, historical log, profile, cookies, video chat list, IP addresses, domains, networks, sub-networks, and/or the like. Also, Feedback and Rank Controls 426 are provided for viewing, editing, and providing feedback and ranking information regarding a video message from the unavailable user.

Figure 5:
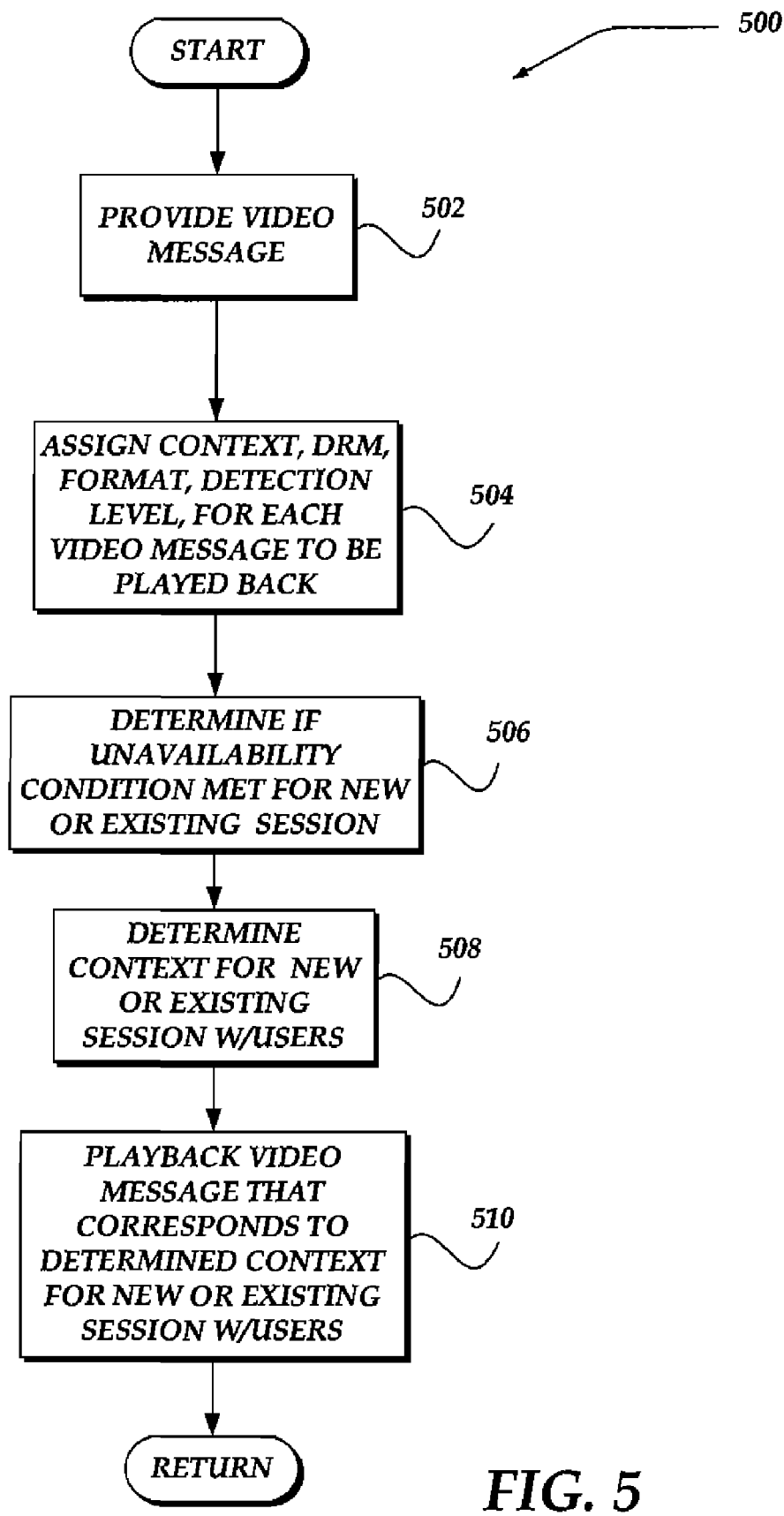
FIG. 5 shows a flow chart for the operation of a virtual video message answering machine platform.

FIG. 5 illustrates a general overview of process 500 for providing a virtual video message answering service to users of a video communication session. Moving from a start block, the process steps to block 502 where the video message is provided by a user. In at least one embodiment, the user may record original content for the video message, and in at least one other embodiment, the video message is prerecorded by the user or another third party. At block 504, the user assigns at least context to each video message to be played back to another user when the user is unavailable. Optionally, the user can also identify a particular digital rights management (DRM) tool for protecting the video message from unauthorized copying and/or editing. Also, the user can optionally include an initial video format for the video message, and optionally indicate a minimum level of motion to be detected by a video camera or else a contextual video message will be played for the other user.

Flowing to block 506, the process determines if an unavailability condition has been met, such as one or more hot keys previously designated by the user are now currently selected by the user to indicate the user's unavailability, minimum level of motion detection has not been met for a predetermined period of time, time periods for inactivity with a pointing device and/or keyboard has expired, or a predefined schedule indicates the unavailability of the user. These determinations are made for either existing or newly initiated video communication sessions. At block 508, the process determines the context of the other users in regard to the unavailable user, and the one or more available video messages associated with the determined context in either a new or existing video communication session. Moving to block 510, the process provides and plays back the video message that corresponds to the determined context for the other users in either a new or existing video communication session. Next, the process moves to evaluating other actions.

Figure 6:
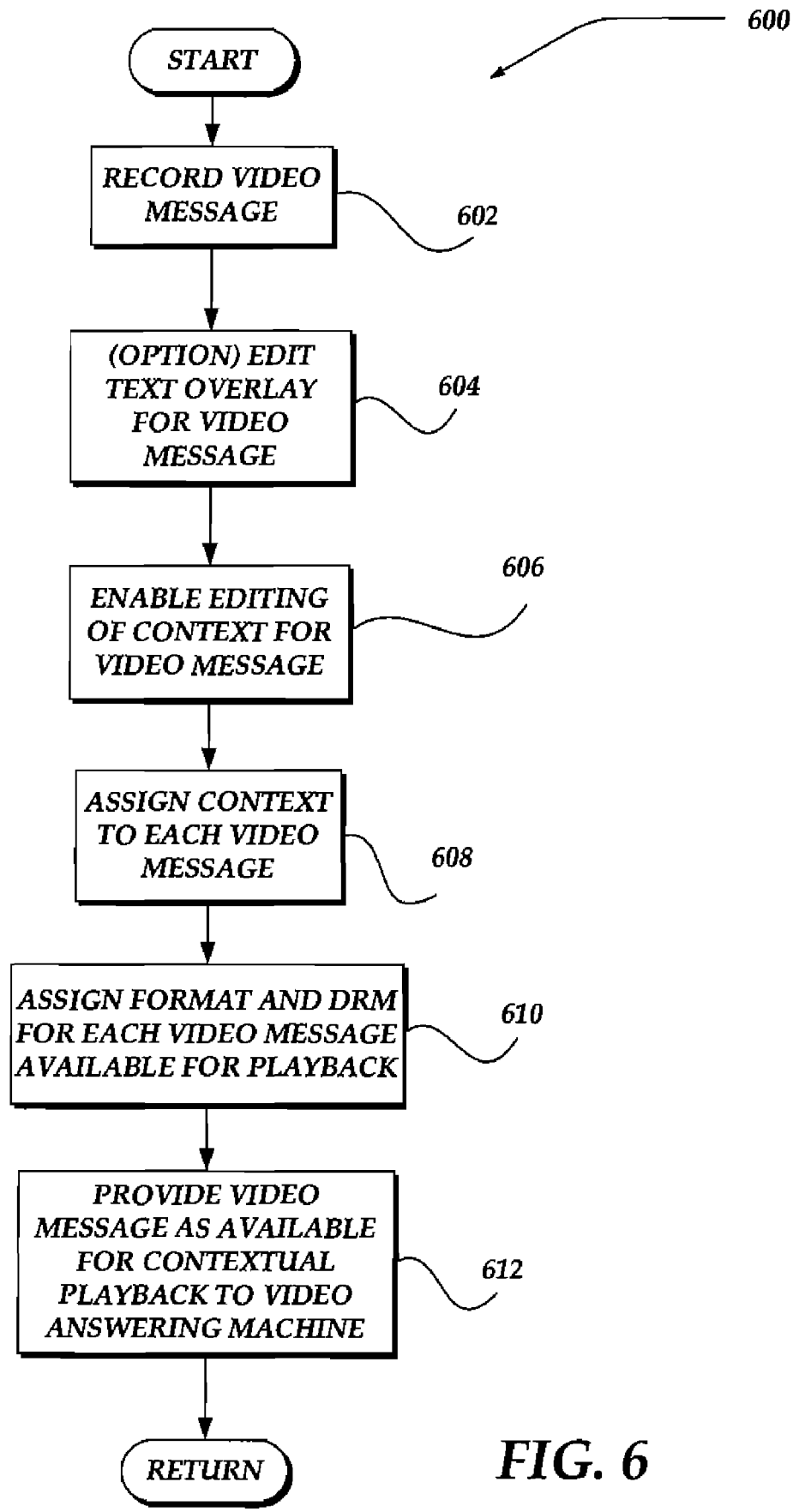
FIG. 6 illustrates a flow chart for generating a video message for playback with a virtual video message answering machine platform.

FIG. 6 illustrates a flowchart of process 600 for generating a video message for a user to be subsequently played back to other users if the user is unavailable. Moving from a start block, the process steps to block 602 where original content for the video message is recorded by the user or provided as prerecorded content by a third party. During the recording process the user can edit the recorded video message, including, but not limited to, cue, pause, record, dub, fast forward, forward, reverse, fast reverse, split screen, and/or the like.

Optionally, at block 604, the process enables the user to edit and/or composit text, graphics, pictures, or the like, provided as an overlay to the content of the video message or enables the user to record and/or composit the text, graphics, pictures, or the like as the primary content for the video message. At block 606, the process enables the user to edit the content of the video message, including, but not limited to, editing video effects, compositing different elements, editing sound, fast forward, forward, reverse, fast reverse, play, pause, split screen, and/or the like. At block 608, the process enables the user to assign a context for the video message and also identify the context of other users that are likely to participate in a video communication session with the user. The different types of contextual information for a video message can include, but is not limited to, generic (default), work, personal, events, holidays, seasons, weather, family, individual relationships, and/or the like. Also, there are several processes that can be employed to identify the context of the other users, including the other user's contact lists, buddy lists, friends list, social networks, historical log, profile, cookies, video chat list, IP addresses, domains, networks, subnetworks, and/or the like.

At block 610, the process enables the user to assign the initial format that the video message will be provided to the other users. Also, the user can select a digital rights management (DRM) tool to control unauthorized copying and/or editing of the content of the video message. Advancing to block 612, the process provides the video message as available for contextual play back by the video message answering machine platform to other users of a video communication session if the user is unavailable. Next, the process returns to evaluation other actions.

Figure 7:
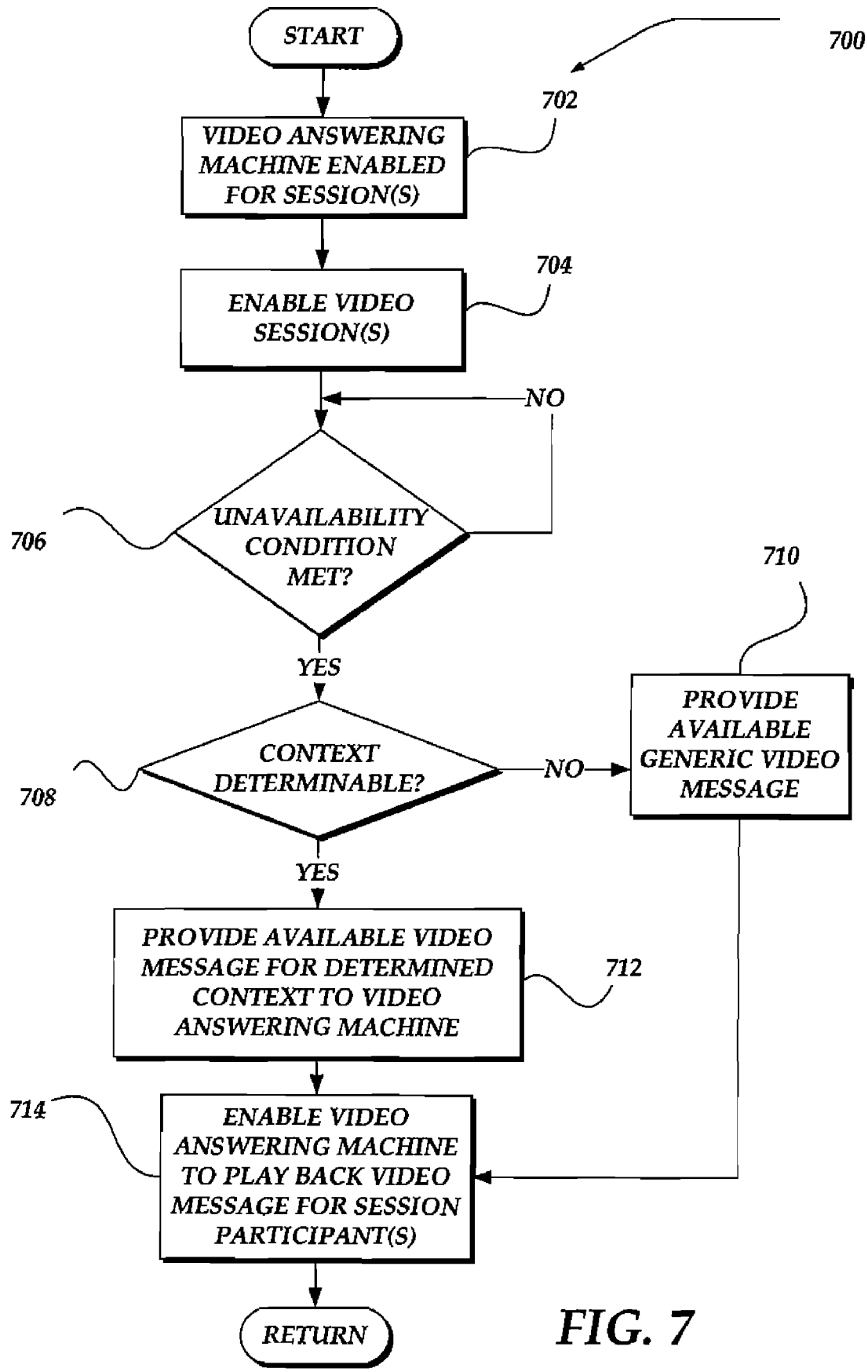
FIG. 7 shows a flow chart for enabling the operation of a virtual video message answering machine platform, in accordance with the invention.

FIG. 7 illustrates a flowchart of process 700 for providing a video message to other users of a video communication session if the user is unavailable. Moving from a start block, the process flows to block 702, where the user enables the video message answering machine platform for operating with existing or new video communication sessions. At block 704, at least one video communication session is initiated or is determined to already exist with at least one other user.

Flowing to decision block 706, the process determines if one or more previously designated unavailability conditions are now met, e.g., at least one hot key is selected by the user, a minimum level of motion has not been detected for a predetermined period of time, time periods for inactivity with a pointing device and/or keyboard has expired, or a predefined schedule indicates the unavailability of the user. If false, the process continues to loop at this determination, however, if the determination is true, than the process flows to decision block 708 where the context is determined for the other users of the video communication session. If the context is not determinable, the process flows to block 710 where the generic contextual video message is provided. And at block 714, this generic video message is provided to the video message answering machine platform for playback to the other users of the video communication session.

However, on the other hand, if the determination at block 708 was true, i.e., the context of the other users is determinable, then the process flows to block 712 where one or more available video messages that correspond to the determined context of the other users is provided. The process moves again to block 714 where the particular contextual video message(s) are played back for the other users of the video communication session. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed as new and desired to be protected by Letters Patent of the United States is:

1. A method for managing messages in an existing communication session, the communication session comprising a plurality of users communicating with one another over a network, the method comprising:
    determining, by a computing device, an unavailability condition has occurred with respect to a first user of the plurality of users in the existing communication session,
    determining a second user context associated with a second user of the plurality of users; and
    providing, over the network, to the second user of the plurality of users, a first video of a plurality of videos associated with the first user, wherein a respective context associated with the first video of the plurality of videos corresponds to the second user context.

2. The method of claim 1, further comprising:
    receiving, over the network, from the second user of the plurality of users a video reply message for subsequent playback by the first user of the plurality of users.

3. The method of claim 2, further comprising:
    enabling the second user of the plurality of users to select a prerecorded video message as the video reply message.

4. The method of claim 1, wherein the unavailability condition comprises at least one of: a selection of at least one hot key by the first user of the plurality of users, a motion detection minimum level associated with the first user of the plurality of users, a movement sensitivity minimum level associated with the first user of the plurality of users, a time period for pointing device inactivity associated with the first user of the plurality of users, a time period for keyboard device inactivity associated with the first user of the plurality of users, and a predefined schedule associated with the first user of the plurality of users.

5. The method of claim 1, wherein the first video of the plurality of videos includes digital rights management information used to prevent unauthorized copying and editing of the first video of the plurality of videos.

6. The method of claim 1, wherein the context associated with the first video of the plurality of videos is at least one of: generic, work, personal, events, holidays, seasons, weather, family, and individual relationship.

7. The method of claim 1, wherein predetermining the second user context comprises a determination that the second user of the plurality of users is known to the first user of the plurality of users, and wherein the second user and the first user are associated with at least one of the same contact list, buddy list, friends list, social network, historical log, profile, cookie, video chat list, IP address, domain, network, or subnetwork.

8. The method of claim 1, further comprising:
    receiving, over the network, from the second user of the plurality of users a reply message to the first video of the plurality of videos comprising a text message.

9. The method of claim 1, further comprising:
    receiving, over the network, from the second user of the plurality of users, a rank for the first video of the plurality of videos, wherein the rank comprises at least one of: creativity, appropriateness, quality of production, and relevance, such that the rank is provided to the first user of the plurality of users using at least one of: email, text message, alerts, website posting, blog, and chat room.

10. A system for managing messages in an existing communication session, the communication session comprising a plurality of users communicating with one another over a network, the system comprising:
    at least one processor; and
    memory storing instructions configured to instruct the at least one processor to:
    determine an unavailability condition has occurred with respect to a first user of the plurality of users in an existing communication session,
    determine a second user context associated with a second user of the plurality of users; and
    provide, over the network, to the second user of the plurality of users, a first video of a plurality of videos associated with the first user of the plurality of users, wherein a respective context associated with the first video of the plurality of videos corresponds to the second user.

11. The system of claim 10, wherein the memory further stores instructions configured to instruct the at least one processor to:
    receive, over the network, from the second user of the plurality of users a video reply message for subsequent playback by the first user of the plurality of users.

12. The system of claim 11, wherein the at least one processor is further configured to:
    enable the client application to select a prerecorded video message as the video reply message.

13. The system of claim 10, wherein the memory further stores instructions configured to instruct the at least one processor to:
    enable a client application on a device associated with the first user of the plurality of users to indicate the unavailability condition has occurred, wherein the unavailability condition comprises at least one of: a selection of at least one hot key by the first user of the plurality of users, a motion detection minimum level associated with the first user of the plurality of users, a movement sensitivity minimum level associated with the first user of the plurality of users, a time period for pointing device inactivity associated with the first user of the plurality of users, a time period for keyboard device inactivity associated with the first user of the plurality of users, and a predefined schedule associated with the first user of the plurality of users.

14. The system of claim 10, wherein the first video of the plurality of videos includes digital rights management information used to prevent unauthorized copying and editing of the first video of the plurality of videos.

15. The system of claim 10, wherein the context associated with the first video of the plurality of videos is at least one of: generic, work, personal, events, holidays, seasons, weather, family, and individual relationship.

16. The system of claim 10, wherein the memory further stores instructions configured to instruct the at least one processor to:
    predetermine the second user context, wherein the second context comprises a determination that the second user of the plurality of users is known to the first user of the plurality of users, wherein the second user and the first user are associated with at least one of the same contact list, buddy list, friends list, social network, historical log, profile, cookie, video chat list, IP address, domain, network, or sub-network.

17. The system of claim 10, wherein the memory further stores instructions configured to instruct the at least one processor to:
receive, over the network, from the second user of the plurality of users a reply message to the first video of the plurality of videos comprising a text message.

18. The system of claim 10, wherein the memory further stores instructions configured to instruct the at least one processor to:
receive, over the network, from the second user of the plurality of users, a rank for the first video of the plurality of videos, wherein the rank comprises at least one of: creativity, appropriateness, quality of production, and relevance, such that the rank is provided to the first user of the plurality of users using at least one of: email, text message, alerts, website posting, blog, and chat room.

19. A non-transitory computer-readable storage medium storing computer-readable instructions for managing messages in an existing communication session, the communication session comprising a plurality of users communicating with one another over a network, wherein the instructions, when executed, cause a system to:
determine an unavailability condition has occurred with respect to a first user of the plurality of users in an existing communication session,
determine a second user context associated with a second user of the plurality of users; and
provide, over the network, to the second user of the plurality of users, a first video of a plurality of videos associated with the first user of the plurality of users, wherein a respective context associated with the first video of the plurality of videos corresponds to the second user context.

20. The method of claim 1, further comprising:
determining a third user context associated with a third user of the plurality of users; and
providing, over the network, to the third user of the plurality of users, a second video of the plurality of videos associated with the first user of the plurality of users, wherein a respective context associated with the second video of the plurality of videos corresponds to the third user context.

21. A method for managing messages in an existing communication session, the communication session comprising a plurality of users communicating with one another over a network, the method comprising:
determining, by a computing device, an unavailability condition has occurred with respect to a first user of a plurality of users in an existing communication session, the communication session comprising the plurality of users communicating with one another over a network;
determining a second user context associated with a second user of the plurality of users; and
provide, over the network, to the second user of the plurality of users, a first message of a plurality of messages associated with the first user of the plurality of users, wherein a respective context associated with the first message of the plurality of messages corresponds to the second user context.

22. The method of claim 21, further comprising:
determining a third user context associated with a third user of the plurality of users; and
providing, over the network, to the third user of the plurality of users, a second message of the plurality of messages associated with the first user of the plurality of users, wherein a respective context associated with the second message of the plurality of messages corresponds to the third user context.

23. A system for managing messages in an existing communication session, the communication session comprising a plurality of users communicating with one another over a network, the system comprising:
at least one processor; and
memory storing instructions configured to instruct the at least one processor to:
determine an unavailability condition has occurred with respect to a first user of the plurality of users;
determine a second user context associated with a second user of the plurality of users; and
provide, over the network, to the second user of the plurality of users, a first message of a plurality of messages associated with the first user of the plurality of users, wherein a respective context associated with the first message of the plurality of messages corresponds to the second user context.

24. The system of claim 23, wherein the at least one processor is further configured to:
determine a third user context associated with a third user of the plurality of users; and
provide, over the network, to the third user of the plurality of users, a second message of the plurality of messages associated with the first user of the plurality of users, wherein a respective context associated with the second message of the plurality of messages corresponds to the third user context.

25. A non-transitory computer-readable storage medium storing computer-readable instructions for managing messages in an existing communication session, the communication session comprising a plurality of users communicating with one another over a network, wherein the instructions, when executed, cause a system to:
determine an unavailability condition has occurred with respect to a first user of a the plurality of users;
determine a second user context associated with a second user of the plurality of users; and
provide, over the network, to the second user of the plurality of users, a first message of a plurality of messages associated with the first user of the plurality of users, wherein a respective context associated with the first message of the plurality of messages corresponds to the second user context.

26. The non-transitory computer-readable storage medium of claim 25, further comprising:
determining a third user context associated with a third user of the plurality of users; and
providing, over the network, to the third user of the plurality of users, a second message of the plurality of messages associated with the first user of the plurality of users, wherein a respective context associated with the second message of the plurality of messages corresponds to the third user context.

* * * * *